United States Patent Office 3,625,711
Patented Dec. 7, 1971

3,625,711
CYCLAMATE-FREE ARTIFICIAL SWEETENER
Marvin E. Eisenstadt, Belle Harbor, N.Y., assignor to Cumberland Packing Corporation, Brooklyn, N.Y.
No Drawing. Continuation-in-part of application Ser. No. 822,024, May 5, 1969, which is a continuation-in-part of application Ser. No. 794,767, Jan. 28, 1969, both now abandoned. This application Nov. 5, 1969, Ser. No. 874,413
Int. Cl. A23l 1/26
U.S. Cl. 99—141 A
8 Claims

ABSTRACT OF THE DISCLOSURE

This invention relates to a saccharine artificial sweetening composition, and more particularly to a sweetening composition, which is free of cyclamate and contains only saccharine as the artificial sweetener but which contains additives which eliminate the undesired bitter aftertaste of saccharine. The additives which are used according to this invention, and which must be used in combination because the only sweetening agent is saccharine, are lactose or dextrose, but preferably lactose, and cream of tartar powder.

This application is a continuation-in-part of Ser. No. 822,024, filed May 5, 1969, now abandoned, which was a continuation-in-part of Ser. No. 794,767, filed Jan. 28, 1969, now abandoned.

BACKGROUND OF THE INVENTION

The use of artificial sweeteners in place of sugar for reduction of caloric intake, for medical reasons, and the like is well known. The most common artificial sweeteners are the saccharines and the cyclamates (which latter are sold under the trademark "Sucaryl").

Both of the above groups of substances are much sweeter than sugar and have no caloric value. However, both of the groups of substances suffer from the disadvantage of leaving a bitter aftertaste in the mouth of the user, and very often a saccharine and a cyclamate are used in order to lower the degree of bitter aftertaste of the sweeteners.

The cyclamates have about 30 times the sweetening power of pure sugar (referring to sugar what is meant always is the normal cane sugar or beet sugar which is used commercially for sweetening and which actually consists mainly of sucrose).

The saccharines have a much higher degree of sweetening power, namely about 300 times the sweetening power of sugar. The saccharines, however, have an even greater bitter aftertaste than the cyclamates, and the saccharines are most often not used alone, but rather in admixture with a cyclamate.

U.S. Pat. No. 3,259,506 is directed to combinations of saccharine and cyclamate with lactose for the purpose of minimizing the bitter aftertaste of the two artificial sweeteners. However, using lactose for this purpose it is still necessary to use a combination of both saccharine and cyclamate in order to obtain a composition which does not have a bitter aftertaste but which still has the desired sweetness. The reason for this is that lactose, while it has the property, when used in sufficient amount, to depress or completely destroy the bitter aftertaste of the artificial sweetener will, when too great a quantity is used alone, have the undesired effect of changing the taste of the food or beverage to which the same is applied. Since saccharine is so extremely sweet, namely 300 times as sweet as sugar, if the saccharine were used alone with lactose, such large amount of lactose would be required in order to depress the bitter aftertaste of the saccharine that when the composition is used, for example to sweeten a cup of coffee, the large amount of lactose would adversely affect the taste of the coffee. This was avoided by combining saccharine and cyclamate along with the lactose.

However, recently there have been medical reports that the cyclamates have undesired physiological side effects, and in fact the United States Food & Drug Administration has recently banned the use of cyclamates. It is therefore apparent that it is desirable to provide artificial sweetening products which do not contain cyclamates, but also which do not have the undesired bitter aftertaste of saccharine.

Generally speaking, in accordance with the present invention, a composition is provided of saccharine, dextrose or lactose, but preferably dextrose, and powdered cream of tartar. Dextrose, of course, is a natural sweetening sugar which has practically the same sweetening effect as normal sugar (by which is meant the normal cane sugar or beet sugar, and which is chemically called sucrose) and can itself be used as a sweetener. Lactose, on the other hand, although it is chemically known as milk sugar, is not a true sweetening agent because it has less than one fifth the sweetness of natural sugar (sucrose). However, in the small amounts used according to the present invention, neither the dextrose nor the lactose could act as a sweetener, the sweetening effect actually being provided by the saccharine. However, the dextrose or the lactose, when used together with the cream of tartar powder, make it possible to provide a composition which avoids the bitter aftertaste of saccharine, while using saccharine alone as the artificial sweetener. Dextrose alone cannot be used for this purpose because the dextrose alone will not sufficiently mask the bitter aftertaste of the saccharine. If lactose alone, on the other hand, were used for this purpose, the bitter aftertaste of the saccharine would be masked, however, there would be too much lactose present, and this would have an adverse effect on the taste of the foods to which the sweetening composition is applied.

While either dextrose or lactose, or even a mixture of dextrose and lactose, can be used with the cream of tartar and a saccharine artificial sweetener to provide a sweetening composition with desirable sweetness and without bitter aftertaste, best results from the standpoint of achieving most nearly true sugar taste, are obtained by the use of lactose alone plus the cream of tartar and saccharine.

It is accordingly a primary object of the present invention to provide a sweetening composition which contains only a saccharine as the artifical sweetener but which does not have the bitter aftertaste of the saccharine while being able to be used with all types of foods without having any undesired effect on the normal taste of the food.

It is yet a further object of the present invention to provide compositions of saccharine, lactose and/or dextrose, and cream of tartar powder, which have no undesired bitter aftertaste and which can be used with all types of food while providing only a sweetening effect of the food which is akin to that of natural sugar.

Other objects and advantages of the present invention will be apparent from a further reading of the specification and of the appended claims.

The term "saccharine artificial sweetener" as used throughout the specification and claims of this case is meant to refer to saccharine itself and the salts thereof such as sodium saccharine, potassium saccharine, etc. Cream of tartar is of course also known as potassium bitartrate.

In accordance with the present invention, the saccharine artificial sweetener is mixed with the cream of tartar powder and with the lactose and/or dextrose in a ratio of 1 part of the saccharine artificial sweetner to ¼–10 parts of cream of tartar powder (most preferably ½–1 part) and with 20–70 parts of lactose and/or dextrose (most preferably 25–35 parts). All parts herein are parts by weight. When these components are used in these proportions, the most desired effect of sweetness approaching that of natural sugar without any bitter aftertaste and without any undesired effect on any food or beverage to which the sweetening composition is used, are obtained.

In percentages by weight, the composition of the present invention consists essentially of about 70–98% of lactose and/or dextrose (preferably 90–97%), about 1.5–7% of the saccharine artificial sweetener (preferably 2–4%), and 0.5–15% of cream of tartar (preferably 1–7%).

In connection with this invention it should be noted that although lactose is chemically sugar (sometimes called milk sugar) it is not generaly used for sweetening. It apparently has a leaching effect on other taste than sweetness so that it leaches out or masks the bitter taste of the artificial sweeteners when used in sufficient quantities. However, if used in too great a quantity it will also leach out or mask the taste of the food or beverage to which it is applied.

For this reason, if lactose alone were used in the compositions of the invention, in order to obtain a sufficient amount of lactose with the saccharine to mask the bitter aftertaste of the saccharine, the amount of lactose would be so great that it would also leach out or mask the taste of the food or beverage to which the composition is applied.

On the other hand, dextrose is actually a sweetening agent and dextrose alone does not have the effect of sufficiently masking the bitter aftertaste of the artificial sweetener. Therefore, with the dextrose it is necessary to use the cream of tartar powder in order to achieve the desired masking of th bitter aftertaste.

Furthermore, if cream of tartar powder alone were used with a saccharine artificial sweetener, there is no possibility at all of masking the bitter aftertaste of the saccharine.

It is only by using the cream of tartar powder with the lactose and/or dextrose, in the proportions indicated above, that it is possible to obtain a complete masking of the bitter aftertaste of the saccharine without adversely affecting the taste of any food or beverage to which the composition is applied.

DESCRIPTION OF PREFERRED EMBODIMENTS

The following examples are given to further illustrate the present invention. The scope of the invention is not, however, meant to be limited to the specific details of the examples.

EXAMPLE 1

50 pounds of lactose (powdered), 4 pounds of cream of tartar powder and 1.0 pound of calcium saccharine are thoroughly mixed to provide a uniform mixture.

The resulting mixture is many times as sweet as natural sugar so that a small amount thereof can be used in place of the sugar to give a sweetening effect with low caloric intake. This composition can be used to sweeten beverages or in cooking, in all quantities, even to highly sweeten beverages, without causing any bitter aftertaste and without adversely affecting the taste of the food or beverage to which it is applied.

EXAMPLE 2

A sweetening composition is prepared as in Example 1, however using 50 pounds of lactose, 5 pounds of cream of tartar powder and 2.5 pounds of saccharine.

Each gram of the above product gives approximately the sweetening power of 2 teaspoons of sugar.

EXAMPLE 3

A sweetening composition is prepared as in Example 1, however using 50 pounds of lactose, 1.5 pounds of cream of tartar powder and 3.0 pounds of saccharine.

EXAMPLE 4

A sweetening composition is prepared as in Example 1, however using 50 pounds of lactose 4, pounds of cream of tartar powder and 2 pounds of saccharine.

EXAMPLE 5

A sweetening composition is prepared as in Example 1, however using 40 pounds of lactose, 0.5 pound of cream of tartar powder and 1 pound of saccharine.

EXAMPLE 6

A sweetening composition is prepared as in Example 1, however using 70 pounds of lactose, 1 pound of cream of tartar powder and 2 pounds of sodium saccharine.

EXAMPLE 7

A sweetening composition is prepared as in Example 1, however using 80 pounds of lactose, 30 pounds of cream of tartar powder and 10 pounds of sodium saccharine.

EXAMPLE 8

A sweetening composition is prepared as in Example 1, however using 50 pounds of lactose, 2.5 pounds of cream of tartar powder and 1.8 pounds of calcium saccharine.

EXAMPLE 9

A sweetening composition is prepared as in Example 1, however using 48 pounds of lactose, 1.75 pounds of powdered cream of tartar and 1.5 pounds of sodium saccharine.

A cup of coffee sweetened with 1 gram of the composition of Example 9 tastes as though it had been sweetened with 2 teaspoons (approximately 10 grams) of ordinary sugar.

The above compositions may be used in baking, in preparing cooked fruits, in cooking, in the making of candies, etc.

EXAMPLE 10

50 pounds of powdered dextrose, 4 pounds of cream of tartar powder and 1.0 pound of calcium saccharine are thoroughly mixed to provide a uniform mixture.

Each approximately 1 gram of the above product gives substantially the sweetening power of 2 teaspoons of sugar. The taste is akin to that of natural sugar and does not have any bitter aftertaste.

EXAMPLE 11

A sweetening composition is prepared as in Example 1, however using 25 pounds of lactose, 25 pounds of dextrose, 2 pounds of cream of tartar powder and 2.5 pounds of saccharine.

Each gram of the above product gives approximately the sweetening equivalent of 2 teaspoons of sugar.

EXAMPLE 12

A sweetening composition is prepared as in Example 1, however using 40 pounds of dextrose, 0.5 pound of cream of tartar powder and 1 pound of saccharine.

EXAMPLE 13

A sweetening composition is prepared as in Example 1, however using 50 pounds of dextrose, 2.5 pounds of cream of tartar powder and 1.8 pounds of calcium saccharine.

It is apparent that variations and modifications of the above compositions can be made without departing from the spirit and scope of the invention.

What is claimed is:

1. A sweetening composition consisting essentially of a saccharine artificial sweetener, cream of tartar powder, and at least one substance selected from the group consisting of lactose and dextrose in proportions by weight of ¼–10 parts of cream of tartar for each part of saccharine artificial sweetener and 20–70 parts of said substance per each part of saccharine artificial sweetener.

2. Composition according to claim 1 wherein said substance is lactose.

3. Composition according to claim 1 wherein said substance is dextrose.

4. Composition according to claim 1 wherein said substance is a mixture of lactose and dextrose.

5. Composition according to claim 1 wherein the proportions of the components of ½–1 part of cream of tartar powder per each part of saccharine artificial sweetener and 25–35 parts of said substance per each part of saccharine artificial sweetener.

6. Composition according to claim 5 wherein said substance is lactose.

7. Composition according to claim 5 wherein said substance is dextrose.

8. Composition according to claim 5 wherein said substance is a mixture of lactose and dextrose.

References Cited

UNITED STATES PATENTS 3,259,506   7/1966   Eisenstadt   99—141 A

RAYMOND N. JONES, Primary Examiner

R. B. ANDEWELT, Assistant Examiner